(12) United States Patent
Wagener et al.

(10) Patent No.: US 6,996,587 B2
(45) Date of Patent: Feb. 7, 2006

(54) METHOD AND APPARATUS FOR MANAGING DATA VOLUMES IN A DISTRIBUTED COMPUTER SYSTEM

(75) Inventors: Peter J. Wagener, Somerville, MA (US); Mark J. Musante, Westford, MA (US); Chhandomay Mandal, Nashua, NH (US); Melora L. Goosey, Andover, MA (US); Roberta A. Pokigo, Billerica, MA (US); George J. Quill, Clinton, MA (US); Peter L. Gratzer, Broomfield, CO (US); Jillian I. DaCosta, Nashua, NH (US); Jonathan C. France, Somerville, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 534 days.

(21) Appl. No.: 09/965,218

(22) Filed: Sep. 27, 2001

(65) Prior Publication Data

US 2003/0061399 A1 Mar. 27, 2003

(51) Int. Cl.
*G06F 17/30* (2006.01)

(52) U.S. Cl. .................. 707/204; 707/200; 719/316; 719/321; 719/328; 719/330; 709/230

(58) Field of Classification Search ............... 709/223, 709/220, 217, 201, 203, 237, 316; 719/330, 719/321, 328; 707/200, 204, 10; 711/162, 711/203; 714/5
See application file for complete search history.

(56) References Cited

U.S. PATENT DOCUMENTS 5,794,013 A 8/1998 McBrearty

| 6,002,085 A | 12/1999 | Utsumi et al. |
| 6,058,401 A | 5/2000 | Stamos et al. |
| 6,205,415 B1 | 3/2001 | Butts et al. |

(Continued)

FOREIGN PATENT DOCUMENTS

EP 0 957 437 A2 11/1999

OTHER PUBLICATIONS

Anonymous, "Core Plans First Quarter Release of T27 and UTS Java Emulators", Unisys World, Jan. 2000, 21, p. 1-2.

(Continued)

*Primary Examiner*—Jean M. Corrielus
(74) *Attorney, Agent, or Firm*—Kudirka & Jobse, LLP

(57) ABSTRACT

Data volumes on local hosts are discovered and managed by federated Java beans that run on each host. The Java beans form part of a three-tiered data services management. The lowest tier comprises management facade software running on each machine that converts platform-dependent interface written with the low-level kernel routines to platform-independent method calls. The middle tier is a set of federated Java beans that communicate with the management facades and with the upper tier of the system. The upper tier of the inventive system comprises presentation programs that can be directly manipulated by management personnel to view and control the system. The federated beans can configure and control data volumes with either a SCSI terminal emulation interface or a storage volume interface and use a logical disk aggregator to present all volumes available on a local host as a single "logical volume" in which all information regarding the various volumes is presented in a uniform manner.

25 Claims, 14 Drawing Sheets

U.S. PATENT DOCUMENTS

| | | | |
|---|---|---|---|
| 6,269,373 | B1 | 7/2001 | Apte et al. |
| 6,298,478 | B1 | 10/2001 | Nally et al. |
| 6,332,163 | B1 | 12/2001 | Bowman-Amulah |
| 6,442,541 | B1 | 8/2002 | Clark et al. |
| 6,453,326 | B1 | 9/2002 | Parham et al. |
| 6,457,065 | B1 | 9/2002 | Rich et al. |
| 6,571,232 | B1 | 5/2003 | Goldberg et al. |
| 6,625,613 | B2 | 9/2003 | Thompson |
| 6,629,128 | B1 | 9/2003 | Glass |
| 6,704,805 | B1 | 3/2004 | Acker et al. |
| 6,718,372 | B1 | 4/2004 | Bober |
| 6,728,788 | B1 | 4/2004 | Ainsworth et al. |
| 6,757,708 | B1 | 6/2004 | Craig et al. |
| 6,772,178 | B2 | 8/2004 | Mandal et al. |
| 2002/0188591 | A1 | 12/2002 | Santosuosso |
| 2003/0014432 | A1 | 1/2003 | Teloh et al. |
| 2003/0014433 | A1 | 1/2003 | Teloh et al. |
| 2003/0033327 | A1 | 2/2003 | Mandal et al. |
| 2003/0061399 | A1 | 3/2003 | Wagener et al. |
| 2003/0074446 | A1 | 4/2003 | Musante et al. |
| 2003/0084116 | A1 | 5/2003 | Musante et al. |
| 2003/0084198 | A1 | 5/2003 | Mandal et al. |
| 2003/0088713 | A1 | 5/2003 | Mandal et al. |
| 2003/0105840 | A1 | 6/2003 | Mandel et al. |

OTHER PUBLICATIONS

Bhide, et al., "Implicit Replication in a Network File Server", IEEE, Unknown, 85-90.

Cai, et al., "SNDR: A New Medium Access Control For Multi-Channel Ad Hoc Networks", IEEE, Unknown, 966-971.

Kyeongho, et al., "Scheduling of Storage and Cache Servers For Replicated Multimedia Data", IEEE, 1997, 484-487.

Madan, et al., "A Distributed Real Time Database For Heterogeneous Computer Control Systems", IEEE, 1995, 435-440.

Makpangou et al., "Replicated Directory Service For Weakly Consistent Distributed Caches", ACN, Unknown, 1-9.

Monson-Haefel, "Enterprise JavaBeans, 2nd Edition", Mar. 2000, 38-39, O'Reilly.

Pu, et al., "Replica Control in Distributed Systems,", ACM, 1991, 377-386.

Srnin, "An Architecture For Extended Abstract Dat Flow", IEEE, 1981, 303-325.

Thomas, "Enterprise JavaBeans Technology, Server Component Model For the Java Platform", Patricia Seybold Group, Dec. 1998, 1-24.

METHOD AND APPARATUS FOR MANAGING DATA VOLUMES IN A DISTRIBUTED COMPUTER SYSTEM

FIELD OF THE INVENTION

This invention relates to management of networked computer systems and to data services such as replication, mirroring, and data "snapshots" and, in particular, to distributed management of data volumes in connection with such services.

BACKGROUND OF THE INVENTION

It is common in many contemporary computer systems to require continuous access to stored information. The conventional data center procedure of taking data storage systems offline to update and backup information is not possible in these computer systems. However, system reliability demands the backup of crucial data and fast access to the data copies in order to recover quickly from human errors, power failures and software bugs. In order to recover from natural disasters, it is common to share data among geographically dispersed data centers.

The prior art has generated several solutions to meet the aforementioned data backup and sharing needs. One prior art solution is data replication in which a second copy or "mirror" of information located at a primary site is maintained at a secondary site. This mirror is often called a "remote mirror" if the secondary site is located away from the primary site. When changes are made to the primary data, updates are also made to the secondary data so that the primary data and the secondary data remain "synchronized."

Data replication can be performed at various levels. For example, the entire database may be mirrored. However, tight synchronization between the primary and mirrored data for an entire database often introduces a significant system performance penalty because of the large number of data update transmissions between the primary and secondary sites that are necessary to ensure transaction and record consistency across the entire database.

To improve system performance when data replication is used some data replication systems replicate only portions of the data. For example, replication may take place at file-level. Conventional file-level replication systems are often incorporated in the software drivers on the host and generally employ conventional networking protocols, such as TCP/IP, to connect to the remote data site over a local or wide area connection.

Alternatively, in other prior art systems, data replication takes place at the volume level, where a volume is a logical, or physical, disk segment. Instead of replicating database transactions or file systems, this technique replicates logical or, in some cases, physical disk volumes. Volume replication is flexible in the sense that it is generally independent of the file system and volume manager software. Volume replication can also be used in conjunction with database and file replication to help ensure that not just the data specific to the database or a particular file system, but all relevant data is replicated to the remote site.

In still other prior art systems, utility software is provided that generates a copy of a data volume at a particular point in time. This data copy is often called a data "snapshot" or "image" and provides a system administrator with the ability to make, and to maintain, replicated data storage systems. The advantage of making snapshots of data volumes is that the snapshot process is relatively fast and can be accomplished while other applications that use the data are running. Accordingly, the process has minimal impact on ongoing data transactions.

In such as system, the original copy of the data is maintained on a "master volume", where the applications store data. Using the snapshot process, the master volume is replicated on another system in what is called the "shadow volume." The shadow volume can be read from, and written to, by another application and it can be used for system tests with a copy of real data without the danger of corrupting the original data.

As the data changes in the master volume and the shadow volume, a "bitmap volume" keeps track of the blocks that change so that to update the shadow or the master, only the blocks marked as changed by bitmap entries need be copied. This method provides quick updates that intrude minimally on system performance with normal business data requirements.

Still other data services can be provided in prior art systems. These include data caching and notification services. No matter which of the data services are used, a significant amount of management time can be consumed in initially setting up the data service and managing it after it is running. For example, management of each of the aforementioned data services requires the ability for a manager to discover volumes existing in the system. On top of the ability to discover the volumes, those volumes must be verified as suitable for data service use and may have to be configured if they are not suitable.

In a large, distributed computer system connected by a network, management personnel and resources may be physically located anywhere in the system. However, the data manipulation processes, which actually perform the data services, are typically low-level routines that are part of an operating system kernel running on a particular machine. These routines typically must run on that machine and are written in a platform-dependent language. Thus, prior art systems required a manager to physically log onto each local host in a distributed system in order to discover the volumes on that local host and verify their usability. The manager then had to manually configure the volumes before any other data services could be used. Further, there was no way to diagnose problems that occurred when several data services were using the same volume.

It was also necessary for a manager to separately manage each discovered and configured volume. Since a large computer system typically involves many volumes, management of individual volumes can consume significant management time.

Therefore, there is a need to provide a simple, fast way to discover volumes on hosts, both local and remote, verify their usability and set up and manage a data service among resources that may be located anywhere in a distributed system and to provide coordination information to a manager who may also be located anywhere in the system.

SUMMARY OF THE INVENTION

In accordance with the principles of the present invention, volumes on local hosts are discovered and managed by federated Java beans that run on each host. The federated beans in each host discover and manage volumes on that host and communicate with other federated beans over the network. This communication allows hosts to interact and to discover volumes on other hosts. The Java beans form part of a three-tiered data services management. The lowest tier comprises management facade software running on each machine that converts the platform-dependent interface written with the low-level kernel routines to platform-independent method calls. The middle tier is a set of federated Java beans that communicate with the management facades and with the upper tier of the system. The upper tier of the inventive system comprises presentation programs that can be directly manipulated by management personnel to view and control the system.

In one embodiment, a data service volume federated bean in each host discovers volumes on that host and controls the volumes via a data services management facade running on the host. The data services volume bean can be controlled by a command line interface or a graphical user interface running on the host. These interfaces allow a manager to view and configure volumes on that host.

In another embodiment, the data service volume federated bean is part of a distributed service system running on the computer system. A look up service, which is part of this service system, can be used to retrieve identifiers to data service volume (DSV) beans available on remote hosts. Using these identifiers, a manager can access the data services volume (DSV) bean on a remote host in order to view and configure volumes on that host without having to log onto the host.

In still another embodiment, the data service volume (DSV) federated bean can configure and control volumes with either a SCSI terminal emulation interface or a storage volume interface.

In yet another embodiment, the data service volume federated bean uses a logical disk aggregator to present all volumes available on a local host volume in which all information regarding the various volumes is presented in a uniform manner.

BRIEF DESCRIPTION OF THE DRAWINGS

The above and further advantages of the invention may be better understood by referring to the following description in conjunction with the accompanying drawings in which.

DETAILED DESCRIPTION

Data Services are software products that consist of two parts: a set of kernel drivers, which provides the actual service on the local platforms, and the user level management software. The kernel drivers would generally by implemented in platform-specific code, for example, in C routines that expose application programmer interfaces (APIs) that can be accessed only from the host in which the layer is installed. The set of kernel drivers providing the service can be installed on application servers as well as dedicated storage servers. These installations are illustrated in FIGS. 1A and 1B.

Figure 1:
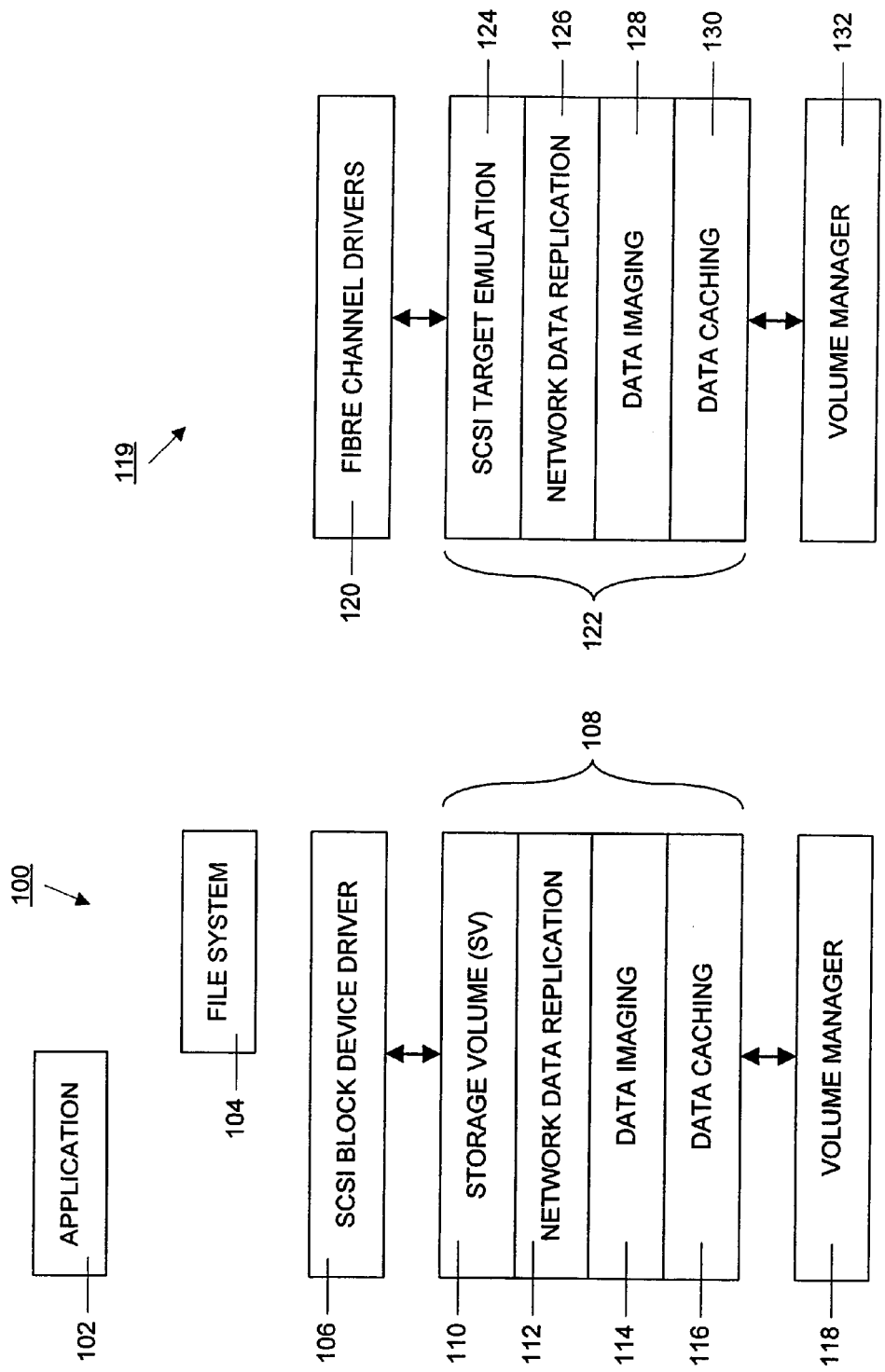
FIG. 1A is a block schematic diagram of illustrating the platform-specific kernel drivers that provide a variety of data services in an application server.
FIG. 1B is a block schematic diagram of illustrating the platform-specific kernel drivers that provide a variety of data services in a storage server.

As shown in FIG. 1A, on an application server 100, the data service kernel modules 108 layer within the operating system I/O stack above volume manager 118 and below the disk device drivers 106. The data service kernel modules include a storage volume module 110 that implements a storage volume interface (SVI) data service that provides data redirection. In particular, the storage volume layer 110 insinuates itself between the standard Small Computer Standard Interface (SCSI) block device driver 106 and the underlying drivers and shunts I/O information through the other data service kernel modules 112–116. The network data replicator kernel module 112 provides data replication services that involve transparent replication of volumes over public or private Internet protocol infrastructure, or locally, via SCSI protocol, over fibre channel connections. Synchronous, asynchronous and semi-synchronous modes of replication are supported. Module 112 provides support for loss of a network link (or a remote node) via a logging mode where I/O writes to a local volume are logged in a separate bitmap volume. When the network link is restored (or the remote node recovers), the remote volume can by resynchronized to the local volume. Module 112 is part of a "StorEdge™ network data replicator system" (SNDR system). "StorEdge™" is a trademark of Sun Microsystems, Inc. The data imaging module 114 implements a "point-in-time" volume copy data service between volumes in a data image volume set. The data image volume set contains the original logical volume (the master volume), the point-in-time copy of the original (the shadow volume) and a volume used to store a bitmap that tracks the differences between the master and shadow volumes. Once the data image volume set is established, the master and shadow volumes can be accessed independently. The data-imaging module allows data updates to be sent from the master volume to the shadow volume as well as updates to be sent from the shadow volume to the master volume when desired.

The caching module 116 provides block based caching operations for disk input/output. These operations provide typical caching functionality, such as read caching, read ahead and small write coalescing for sequential writes. Module 116 also provides write caching when non-volatile RAM cards are installed as a safe store (called a "fast write cache").

On a dedicated storage server 119 as illustrated in FIG. 1B, the kernel modules 122 are located between fibre channel drivers 120 and the volume manager software 132. Modules 122 are accessed through an emulation layer 124 that allows the storage server to appear as a SCSI target to fibre-channel-connected open system hosts. Thus, the SCSI Target Emulation (STE) module 124 provides an STE data service that allows any backend storage to be exported for use on another host through a fiber channel. The host that has the STE kernel module 124 runs a fibre port in SCSI target mode, while the fibre ports at the client run as SCSI initiators.

The network data replicator module 126, the data imaging module 128 and the data caching module 130 operate in the same manner as they do in the application server example shown in FIG. 1A. The data service kernel module architecture requires that any volume that will be used by a data service must already be under the control of either the SCSI Target Emulation (STE) data service module 124, or the Storage Volume Interface (SVI) data service module 110. The difference is that the STE volumes are always exported to remote hosts whereas local volumes must be SVI volumes.

A data services management system constructed in accordance with the principles of the invention comprises three layers or tiers. The first, or upper, tier is a presentation layer with which a manager interacts at a single host location. The upper tier, in turn, interacts with the middle tier comprised of a plurality of federated beans, each of which performs specific tasks in the data services system. The federated beans can communicate with each other both in the same host and in other hosts via a network connecting the hosts. Some of the beans can communicate with the lowest tier that comprises management facades. Management facades communicate to the aforementioned kernel modules that actually perform the data services. In this manner, an entire data service system can be configured and managed from a single location.

Figure 2:
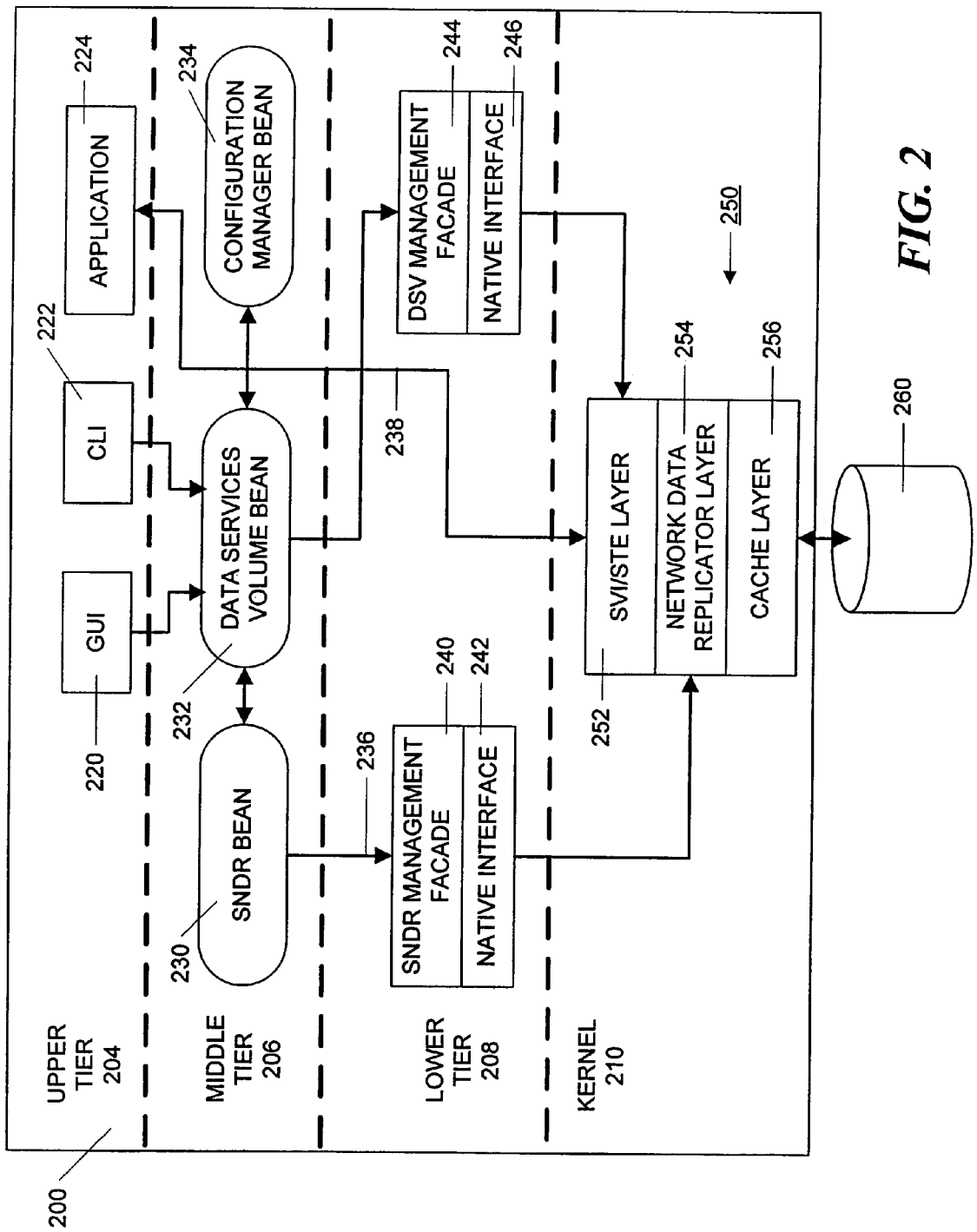
FIG. 2 is a block schematic diagram of a three-tiered system for providing data services in a single host, illustrating an upper presentation tier, a federated bean middle tier and a management facade lower tier.

FIG. 2 shows a host system 200 that illustrates the contents of the three tiers running in a single host. The inventive data service management system comprises three layers or tiers: an upper tier 204, a middle tier 206 and a lower tier 208. The upper tier 204 is a presentation level which can be implemented with either a graphical user interface (GUI) 220 or a command line interface (CLI) 222, both of which are described in detail below. A manager interacts with this level, via the GUI 220 or CLI 222, in order to create, configure and manage a data services system.

The middle tier 206 is implemented with a plurality of Federated Java™ (trademark of Sun Microsystems, Inc.) beans. These beans comply with the Federated Management Architecture (FMA) Specification 1.0, a Java technology-based component architecture and management services for automated, dynamic network management developed by Sun Microsystems, Inc. The FMA specification provides a standard for communication between applications, services and devices across a heterogeneous network, which enables developers to create solutions for complex distributed environments. The FMA Reference Implementation (RI) source code is available at http:/java.sun.com/aboutJava/communityprocess/final.html.

The federated beans use a distributed management framework that implements the FMA specification for distributed management of data services. This framework is called the Jiro™ framework (trademark of Sun Microsystems, Inc.) and is developed by Sun Microsystems, Inc. This framework uses the concept of a management domain to provide services. A management domain is a portion of a network with attached managed resources and available management services used to manage those resources. Within a management domain, the framework provides for base and dynamic services. The base services include, a controller service, an event service, a logging service, a scheduling service and a transaction service. Dynamic services are provided by the federated Java beans of the middle tier. Dynamic services require a hosting entity called a "station", which is a mechanism to allow many services to run within a single Java Virtual Machine. Every management domain contains one or more general-purpose shared stations.

In addition, the Jiro™ technology provides a lookup service that is used to register and locate all Jiro™ technology services, including both base and dynamic services, that are available in a management domain.

Details of the Jiro™ framework and its use are available in the "Jiro™ Technology SDK Programmer's Reference Manual" available at http://www.jiro.com, which manual is incorporated by reference in its entirety.

For volume management purposes, the main federated bean is the data services volume (DSV) bean 232. DSV Bean 232 is responsible for discovering volumes available on the local system 200, controlling those volumes when necessary via an SVI/STE management facade 244, and coordinating the use of those volumes between other data service federated beans. As discussed below, in the process of managing volumes, the DSV bean 232 uses other beans that may be located on the same, or different, machines. These beans include an SNDR federated bean 230 and a configuration manager bean 234 and other beans (not shown in FIG. 2). The beans 230, 232 and 234 can communicate with each other. In addition, the GUI 220 and the CLI 222, which are part of the presentation layer 204, communicate with the DSV bean 232 running in the host 200 where the GUI 220 and CLI 222 are running as indicated in FIG. 2.

DSV Bean 232 is a Federated Bean as described in the aforementioned Federated Management Architecture (FMA) specification. When created, it registers itself with a local Jiro™ station, and provides its services to any other federated beans within the same Jiro™ management domain. Effectively, DSV Bean 232 provides other federated beans in the management domain acting as clients the ability to explicitly or implicitly control the SVI and STE data services on its host, as necessary.

Along with providing the ability to control the SVI and STE data services, DSV Bean 232 also gives clients the ability to discover what other applications are currently using a particular volume. Assuming these other applications have implemented the required interfaces, clients can also retrieve more detailed information about volume usage. For example, a client can discover if one of the data services is currently blocking write access to a specified volume. Thus, the DSV bean 232 provides tools that applications can use to correctly diagnose errors produced when multiple data services attempt to access volumes in an inconsistent manner.

The volume managing capability of the invention is actually implemented in the kernel layer 210 shown running in host 200 in FIG. 2. In particular, access by the host 200 to a resource 260, which can be a data storage component, is provided by a layered stack 250 comprising the aforementioned SVI or STE layer 252, as appropriate, an SNDR data service layer 254 and a cache layer 256 and may also include other layers (not shown in FIG. 2). Application programs running in host 200, such as application 224, and the host file system access resource 260 though the layered stack 250 as indicated schematically by arrow 238.

In order to provide for remote management capability in accordance with the principles of the invention, the SVI/STE layer 252 and the SNDR layer 254 are controlled by software running on the lower tier 208 of the inventive data services system. The lower tier includes a native interface 246 that converts the APIs exported by the SVI/STE layer 252 into a platform-independent language, such as Java™ The native interface 246 is, in turn, controlled by a DSV management facade 244 that provides the required remote management capability.

The DSV management facade 244 provides a means by which the SVI/STE layer 252 can be accessed and managed as a Jiro™ service, i.e., a service that can be managed in a distributed environment from a remote host. The DSV management facade 244 is essentially an object-oriented model of the kernel-resident SVI/STE layer 252. It provides a collection of APIs to manage the SVI/STE layer 252. The DSV federated bean 232 uses the DSV management facade 244 to configure, control and examine the status of the SVI/STE layer 252 and to provide other important functions.

SNDR bean 230 implements the aforementioned SNDR system and also communicates with a DSV bean, such as bean 232, whenever bean 230 starts or stops using a volume managed by DSV bean 232. In order to manage a data replication system, SNDR bean 230 communicates with a network data replication layer 254 in the layered stack 250, via an SNDR management facade 240 and a native interface 242. As with the corresponding data services management facade 244 and native interface 246, the SNDR management facade 240 provides a means by which the SNDR layer 254 can be accessed and managed as a Jiro™ service. The native interface 242 converts the platform-specific kernel routine API's to platform independent interfaces. The SNDR layer 254 allows the SNDR bean 230 to manage logical volume sets for use by a data replication system.

Whenever changes are made in the data configuration of host 200, both the SNDR bean 230 and the DS bean 232 can inform a configuration manager bean 234 of the change in configuration information. SNDR bean 230 also retrieves configuration information from the configuration manager bean 234 under appropriate situations. The configuration manager bean 234 maintains a persistent view of the configuration of the data services system on host 200. In this manner, if the host is interrupted during an operation, it can be restored to the proper state when the operation is resumed.

Figure 3:
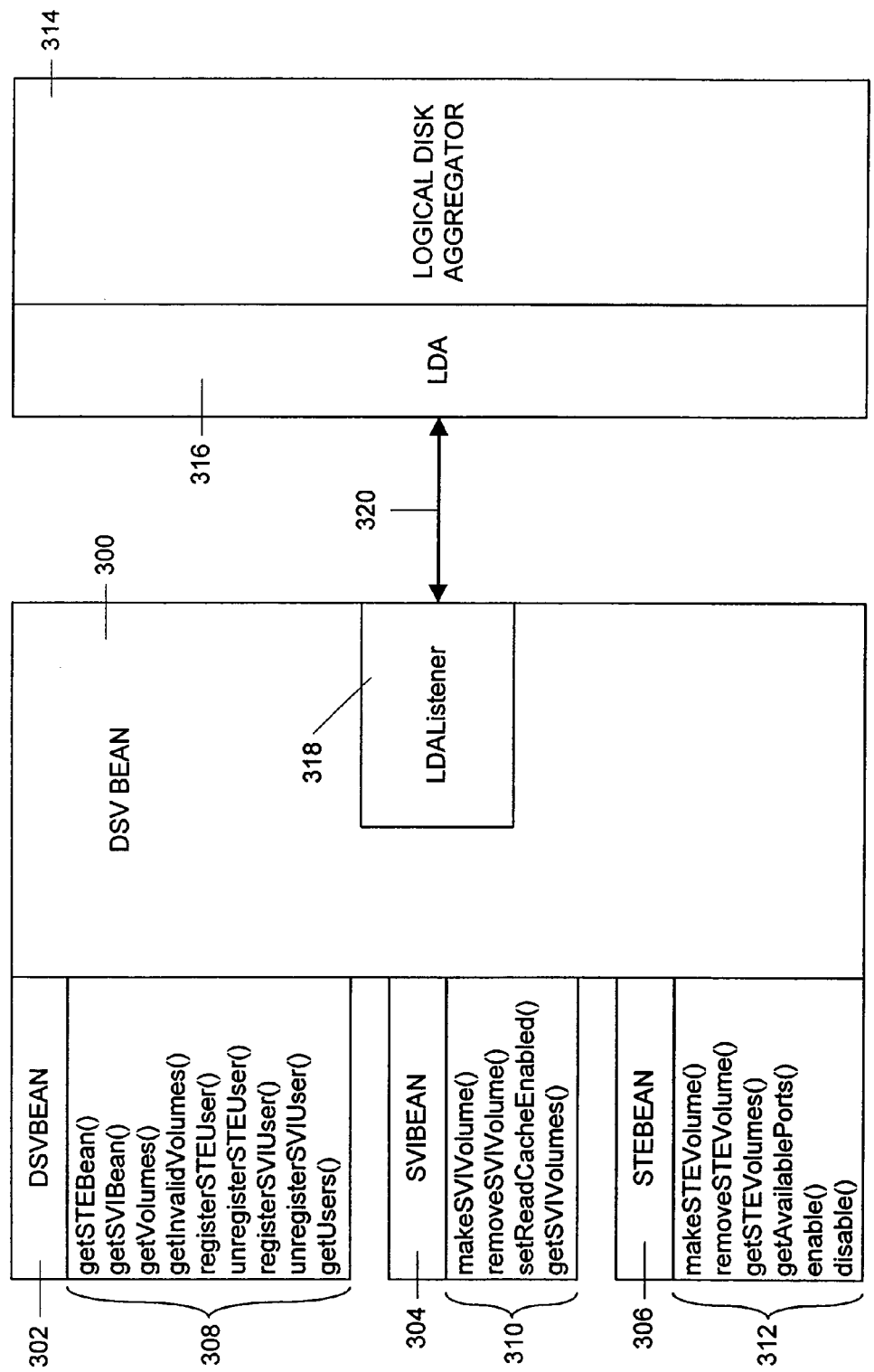
FIG. 3 is a schematic block diagram illustrating the architecture of a DSV bean and the interfaces exported by the bean.

The internal architecture of DSV Bean 232 is shown in FIG. 3. In that figure, DSV bean 300 has three interfaces: DSVBean 302, SVIBean 304, and STEBean 306. DSV Bean 300 provides both implicit and explicit management of the SVI and STE data services. Implicit management is performed via the DSVBean interface 302, while explicit management is performed using the SVIBean interface 304 and the STEBean interface 306.

The DSV Bean 300 accomplishes the explicit management of the SVI and STE data services by using the DSV management facade 244 for those services. In this case, the DSV Bean 300 acts as a central point of contract for doing volume-centric management within the data services arena. Implicit management comes into play when an application bean—a Jiro™-based federated bean that is a client of the DSV Bean 300 and is typically responsible for managing one of the other data services (such as data imaging or data replication)—wishes to use the SVI or STE data services.

Bean 300 manages volumes by using the concept of an SVI or STE volume user. When such an application bean wishes to use a volume, it registers itself with the DSV Bean 300 via methods in the SVIBean and STEBean interfaces, 304 and 306, described below. If necessary, the DSV Bean 300 configures the volume in question as either an SVI or an STE volume, adding the volume to the appropriate data service layer. As a part of the registration process, the application bean provides a proxy object back to itself. The DSV Bean 300 keeps this proxy as part of a list of the users of the volume.

When an application bean is done using a volume, it calls other methods in the SVIBean or STEBean interfaces, 304 and 306. DSV Bean 300 then removes the proxy of that bean from the volume user list. If that volume does not have any more registered users, and that volume was not explicitly created by the removed user, it is deconfigured from the SVI or STE data service.

At any point, an application bean can request the list of users of a specific volume from the DSV Bean 300. DSV Bean 300 will respond by providing the full collection of proxies to the federated beans that are currently using the volume. Each application bean must implement an SVIVolumeUser or STEVolumeUser interface and, assuming the interfaces are implemented correctly, other application beans can collect useful data on client that are currently using the volume and precisely how the volume is being used.

The DSVBean interface 302 is the main public interface to the DSVBean 300. The DSVBean interface 302 is used by the other federated beans to find information about local volumes, register themselves as a user of a particular volume, as well as determine how other beans are using specific data service volumes. The DSVBean interface 302 provides methods to retrieve both the SVIBean and STEBean interfaces 304 and 306, so only one Jiro™ lookup is necessary to use all the interfaces.

The DVSBean interface 302 is intended to be a coordinator of data service volume usage and it implicitly adds and removes volumes to the STE and SV data services on behalf of other management components that register as users of volumes. Therefore, the other components do not have to know the details of the SV or STE data services. The main responsibility of the DSVBean interface 302 is to take actions on behalf of other application beans to guarantee that the volumes they are using are a part of an SV or STE data service.

The methods 308 implemented by the DSVBean interface 302 include the getSteBean( ) method that gets a reference to the STE bean interface and the getSVIBean( ) method that gets a reference to the SVI bean interface.

Also included are the getvolumes( ) method that gets all volumes currently known by DSV and the registerSTEUser( . . . ) method that registers an application bean as an STEVolumeUser. The calling bean passes in a proxy to itself that the DSVBean 300 can use. The unregisterSTEUser( . . . ) method unregisters the user of the volume.

Further methods include the unregisterSVIUser( . . . ) method that unregisters a user and the getusers( . . . ) method that returns a collection containing all the users of a specified volume. The collection contains proxies to objects that implement the SVIVolumeUser or STEVolumeUser interface.

The SVIBean interface 304 provides direct control of an SVI data service. As previously mentioned, in the kernel module architecture, the SVI data service acts essentially as a gateway through which all data destined for local volumes passes before the data is directed to the other data service modules. Because of this, any local volume, which a data service can use, must be controlled by the SVI data service.

While the DSVBean interface 302 can implicitly create and remove SVI volumes, the SVIBean interface 304 has the ability to explicitly create and remove them. As discussed below, it can be controlled by means of a user interface to give a manager the ability to directly control the SVI data service, if desired. Direct control gives a manager some additional features. For example, if an SVI volume is explicitly configures by a manager, the volume will not be removed from the SVI data service even if its list of users is empty. Any explicitly configured volumes are never implicitly deconfigured.

The methods 310 implemented by the SVIBean interface 304 include the makeSVIVolume( . . . ) method that explicitly adds a volume to the SVI data service and the removeSVIVolume( . . . ) method that removes a volume from the SVI data service. Additional methods include the setReadCacheEnabled( . . . ) method that sets the state of the read-caching software for the volume and the getSVIVolume( . . . ) method that returns a collection of the volumes that are currently configured in the SVI data service.

Like the SVIBean interface 304, the STEBean interface 306 provides direct control of an STE data service. An STE data service also acts as a gateway through which data services bound passes. The difference between a volume controlled by an SVI data service and a volume controlled by an STE data service is that STE volumes are exported to a remote host, whereas SVI volumes are used locally. Therefore, STE volumes are not available for use on the local system.

The methods 312 implemented by the STEBean interface 306 include the makeSTEVolume( . . . ) method that explicitly adds a volume to the STE data service and the removeSTEVolume( . . . ) method that removes the volume from the STE data service. Additional methods include the getSTEVolumes( . . . ) method that returns a collection of the available fibre ports on this system that can be used for STE, the enable( . . . ) method that enables the STE data service and the disable( . . . ) method that disables the STE data service.

The DSV Bean 300 has the ability to discover local volumes, verify those volumes as suitable for data service use, and present the volumes in a uniform manner to the other management components. This ability is provided by a logical disk aggregator 314. The logical disk aggregator 314 interfaces with the DSV Bean 300 by means of an LDA interface 316 and implements volume discovery. In particular the logical disk aggregator will discover all volumes available on the local system, and present them to the application beans as a "logical volume". The concept of a logical volume means that all disk information is given to the application beans in a uniform manner. This capability moves the responsibility of finding and verifying disks from the specific application beans to a centralized place.

Logical disk aggregator 314 generates Java™ events, indicated schematically by arrow 320, to communicate with the DSV Bean 300. In particular, the DSV bean 300 implements an LDAListener interface 318 so that it can be notified when logical disk aggregator discovers a new volume. The LDAListener interface 318 includes a configurationChanged ( . . . ) method that is called by the logical disk aggregator 314 whenever the list of known volumes changes.

Also, since volumes appear to the data service applications uniformly, various conventional volume managers can be supported by modifying the logical disk aggregator 314 to recognize volume types used by the volume managers and to export the volume types as logical volumes. For example, volume managers that can be supported include the Veritas™ Volume Manager and Solaris™ Logical Volume Manager, both developed and marketed by Sun Microsystems, Inc., 901 San Antonio Road, Palo Alto, Calif. 94303. In addition, by utilizing the framework provided by the logical disk aggregator, only a small amount of extra engineering work is required to accommodate new volume types.

Figure 4:
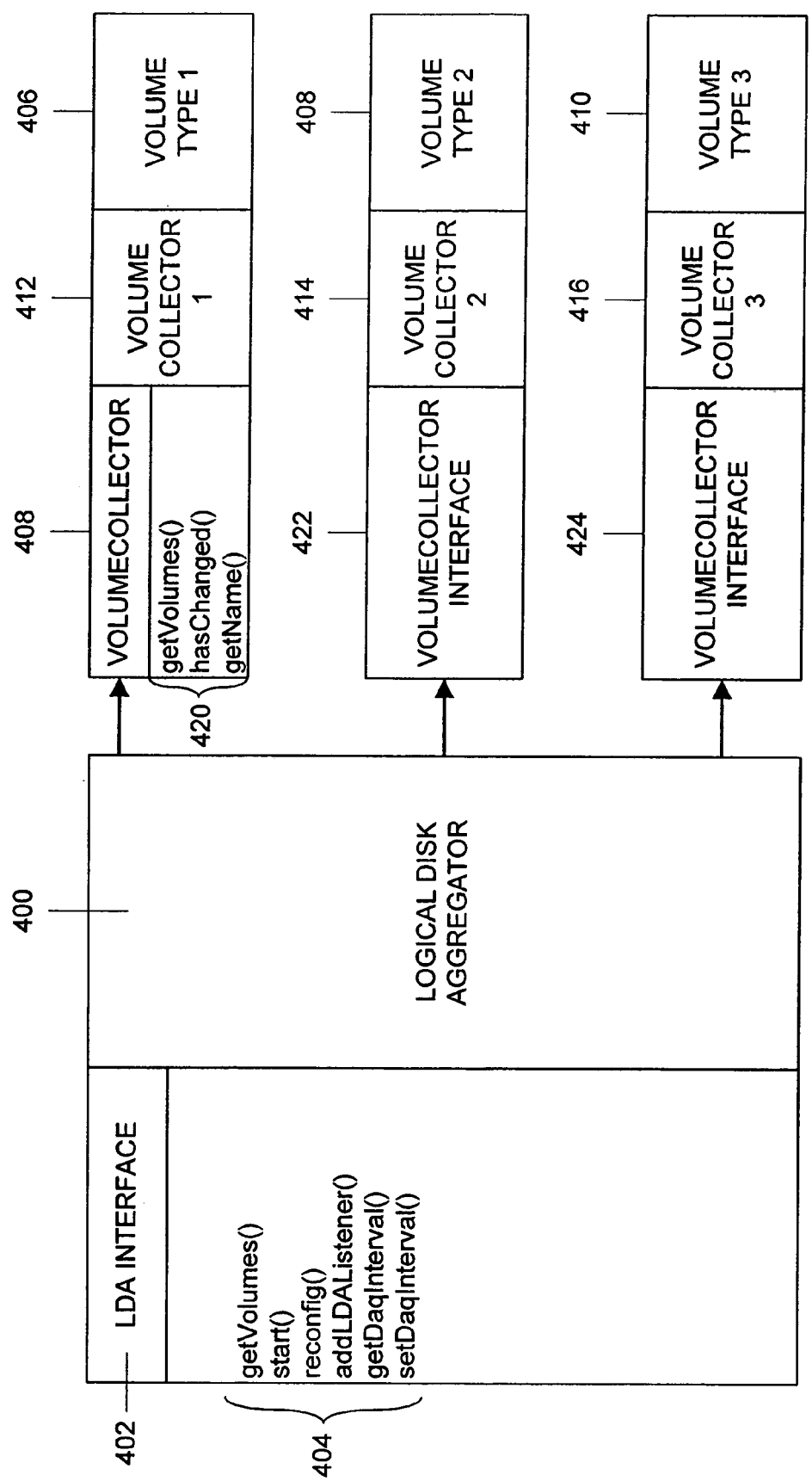
FIG. 4 is a more detailed schematic diagram of a logical disk aggregator and the interfaces exported by the logical disk aggregator.

The logical disk aggregator 314 is shown in more detail in FIG. 4 and is responsible for discovering volumes on the local host and presenting them to clients in a consistent manner. In FIG. 4, logical disk aggregator 400 is illustrated as recognizing and aggregating three types of volumes 406, 408 and 410, but other volume types are also possible. For example, the three volume types, 406, 408 and 410, could be raw volumes corresponding to operating system partitions, SLVM volumes, which are metadevices provided by the aforementioned Solaris™ Logical Volume Manager, and Veritas volumes, which are volumes provided by the Veritas volume manager.

Each volume type, 406,408 and 410 has a dedicated volume collector 412, 414 and 416, respectively, that is written specifically for that volume type. However, each volume collector, 412, 414 and 416, implements the same VolumeCollector interface, 418, 422 and 424, respectively. Since the interface is the same regardless of the volume type, adding new volume types to the list of those supported is a minimal engineering task. It involves providing an object that implements the VolumeCollector interface, then adding that object to the logical disk aggregator code base. The methods provided by the VolumeCollector interface include a getvolumes( ) method that gets the volumes discovered the VolumeCollector, a HasChanged( ) method that returns the logical value "true" if the set of volumes known by the collector have changed and a GetName( ) method that gets the name of the particular volume collector.

Once the volumes are discovered by their appropriate VolumeCollectors, they are presented via the LDA interface 402 to the DSV Bean 300 (FIG. 3) in a uniform manner. The LDA interface 402 allows the retrieval of the collection of volumes on the local system, the reconfiguration of logical disk aggregator subsystems, and other management details. The methods provided by this interface include the getvolumes( ) method that retrieves a current collection of DSVolume objects. Each DSVolume object represents a disk volume.

The LDA interface methods also include the start( ) & reconfig( ) methods that initialize (or re-initialize) the logical disk aggregator to look for all types of recognized volumes. At start time (or at re-initialization), all the known VolumeCollector interfaces are queried for existence of volumes. After than, only VolumeCollectors that previously had existing volumes are checked.

An addLDAListener( . . . ) method allows the DSV Bean to subscribe to the set of listeners that are notified of logical disk aggregator events. The DSV Bean provides a reference to itself and uses the LDAListener interface 318 as described above. The get/setDaqlnterval( . . . ) methods get and set a time interval that determines how often the logical disk aggregator polls the local system for new volumes.

Figure 5:
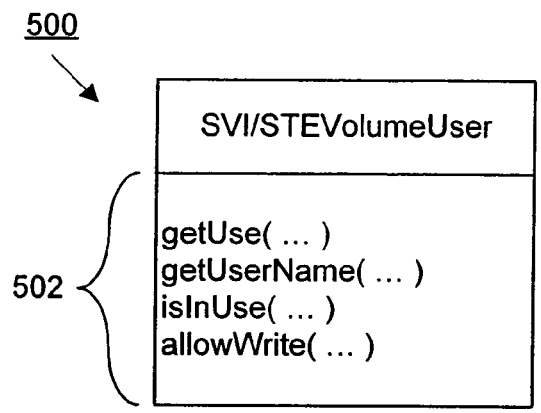
FIG. 5 is a schematic diagram illustrating the SVI/STEVolumeUser interface.

As previously mentioned, any application bean client of the DSVBean that wishes to implicitly control the SVI and STE data services must implement an SVIVolumeUser or an STEVolumeUser interface, respectively. These interfaces are identical and are illustrated in FIG. 5. Both interfaces 500 provide methods 502 including a getuse( . . . ) method that retrieves how the application bean is currently using the specified volume and a getUserName( . . . ) method that retrieves the name of the application bean. Other methods include the isInUse( . . . ) method that returns a logical vale of "true" if the bean is actually using the volume. This latter method is used when the DSVBean is attempting to recover from a failure. Finally, the methods include an allowWrite( . . . ) method that returns a logical value of "true" if the data service being managed by the bean is allowing writes to the specified volume. These methods are typically called when an application bean (or the DSV Bean itself) is querying another application bean for details on volume usage.

As previously mentioned, the DSV Bean controls the data services kernel layers that actually perform the data services by means of a Jiro™-based management facade. In the case of the DSV Bean, there are actually two management facades: an STE management facade and an SVI management facade.

Figure 6:
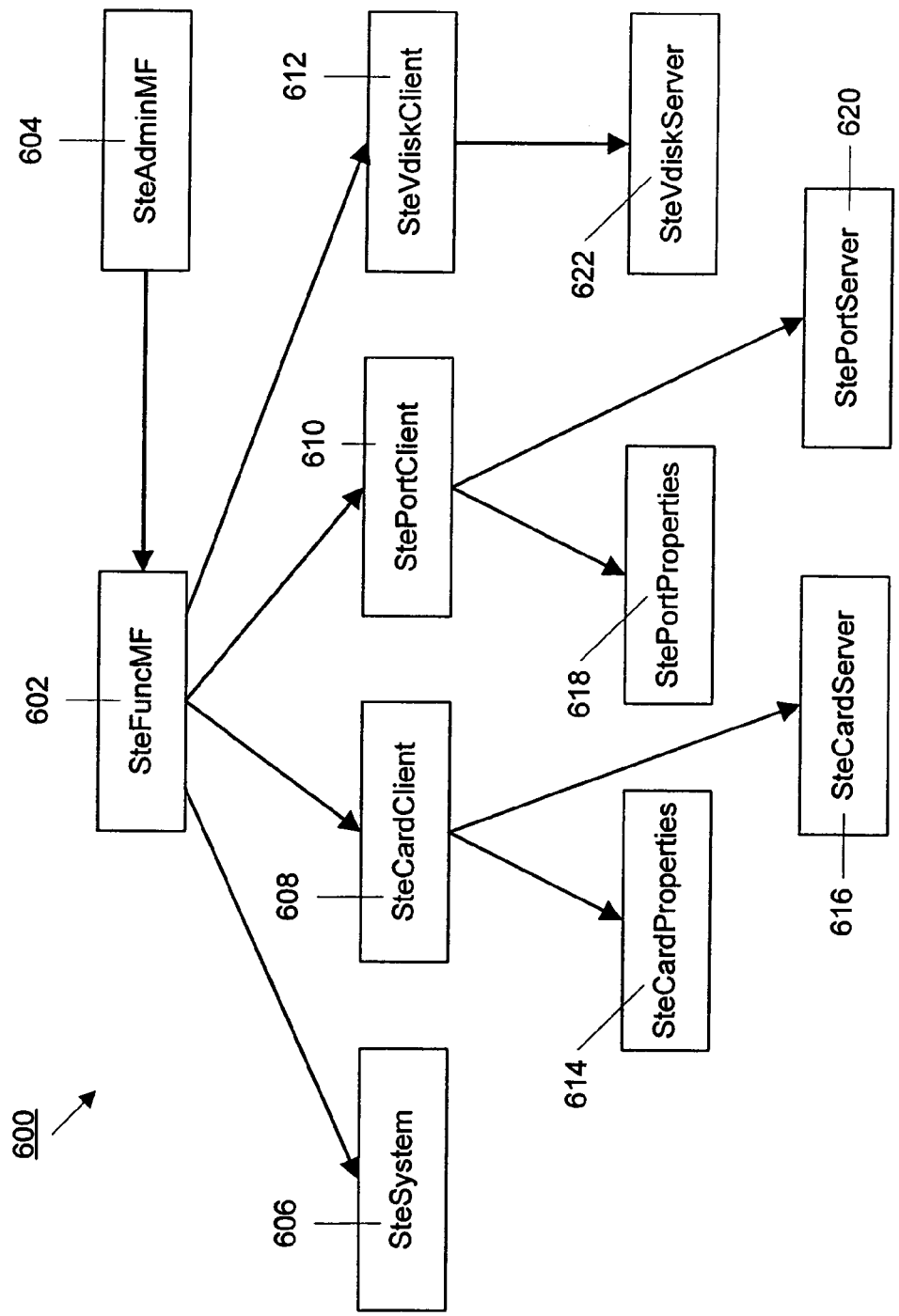
FIG. 6 is a schematic diagram of the interfaces exported by an STE management facade.

FIG. 6 illustrates the STE management facade that is part of DSV management facade. Interfaces 600 are used by the DSV Bean. The DSV Bean can lookup the STE administrative interface, SteAdminMF 604, through the Jiro™ lookup service. The STE functional interface, SteFuncMF 602, can also be discovered through the Jiro™ lookup service as well as can be retrieved from the SteAdminMF interface using a getSteFuncMF( ) method. Once the DSV Bean gets the STE functional interface 602, it can call the relevant client interfaces such as SteSystem 606 that provides mechanisms to manage the STE point object. The DSV Bean can also call the StePortClient interface 610 that provides mechanisms to perform port access functions on the STE system and the SteCardClient interface 608 that provides mechanisms to perform card access functions on the STE system. The SteVdiskClient interface 612 that provides the mechanisms to perform vdisk access functions on the STE system can also be called.

The SteCardClient interface 608, in turn, includes the SteCardProperties interface 614 that includes methods used by an SteCardClient object for retrieving card properties and the SteCardServer interface 616 used by the SteCardClient object for retrieving card objects.

The StePortClient interface 610, in turn, includes the StePortProperties interface 618 that includes methods used by an StePortClient object for retrieving port properties and the StePortServer interface 620 used by the StePortClient object for retrieving port objects.

The SteVdiskClient interface 612 includes the SteVdiskServer interface 622 used by an SteVdiskClient object for retrieving vdisk objects.

Figure 7:
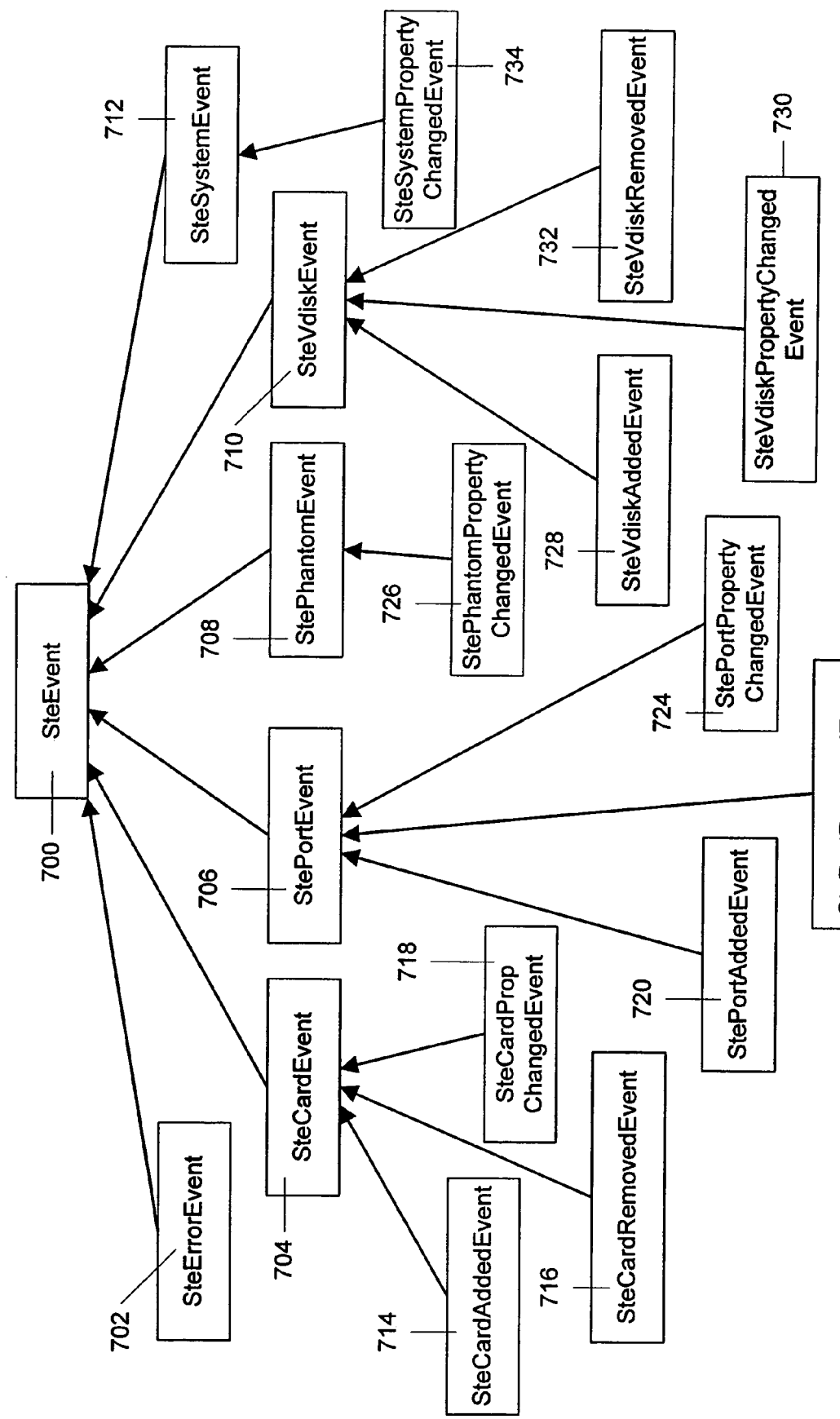
FIG. 7 is a schematic diagram of the event classes in the STE management facade.

FIG. 7 illustrates event classes that can be used to instantiate event objects fired when events of importance occur in an SteSystem. These event classes include the base event class, SteEvent 700. There are six subclasses of the base class 700, all of which are self-explanatory. These include the SteErrorEvent subclass 702, the SteCardEvent subclass 704, the StePortEvent subclass 706, the StePhantomEvent subclass 708, the SteVdiskEvent subclass 710 and the SteSystemEvent subclass 712.

The SteCardEvent subclass 704, in turn, has three subclasses that are self-explanatory. These include the SteCardAddedEvent subclass 714, the SteCardRemoved subclass 716 and the SteCardPropertyChangedEvent subclass 718.

The StePortEvent subclass 706, in turn, has three subclasses that are self-explanatory. These include the StePortAddedEvent subclass 720, the StePortRemoved subclass 722 and the StePortPropertyChangedEvent subclass 724.

Similarly, the SteVdiskEvent subclass 710, in turn, has three subclasses that are self-explanatory. These include the SteVdiskAddedEvent subclass 728, the SteVdiskRemoved subclass 732 and the SteVdiskPropertyChangedEvent subclass 730.

Both the StePhantomEvent subclass 708 and the SteSystemEvent subclass 712 have subclasses that are self-explanatory. These latter subclasses include the StePhantomPropertyChangedEvent subclass 726 and the SteSystemPropertyChangedEvent subclass 734.

Figure 8:
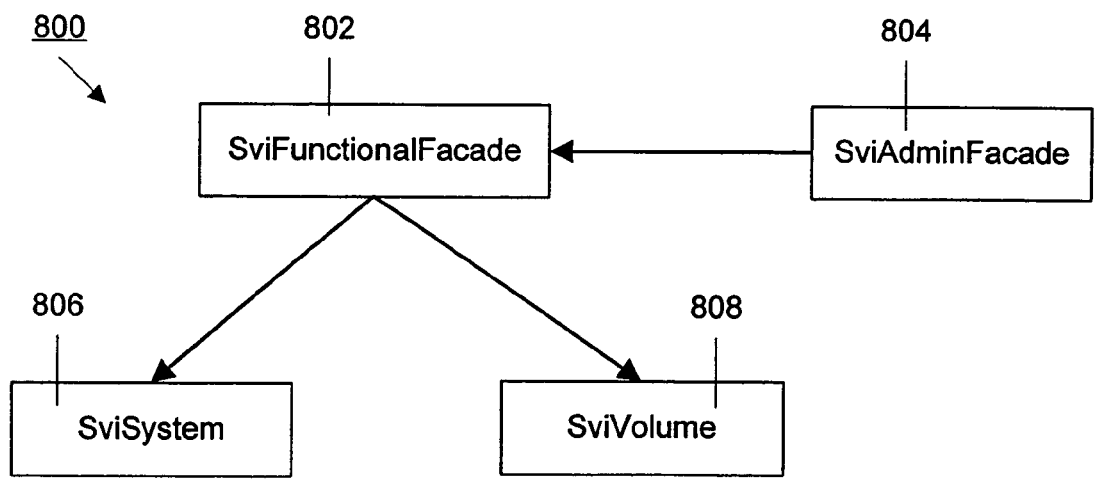
FIG. 8 is a schematic diagram of the interfaces exported by an SVI management facade.

FIG. 8 illustrates the SVI management facade, which is part of DSV management facade, and interfaces 800 that are used by the DSV Bean. The DSV Bean can lookup the SVI administrative interface, SviAdminFacade 804, through the Jiro™ lookup service. The SVI functional interface, SviFunctionalFacade 802, can also be discovered through the Jiro™ lookup service as well as can be retrieved from the SviAdminFacade interface 804 using a getSviFunctionalFacade( ) method. Once the DSV Bean gets the SVI functional interface 802, it can call the relevant client interfaces such as SviSystem 806 that provides mechanisms to manage the SVI point object. The DSV Bean can also call the SviVolume interface 808 that provides mechanisms to perform volume access functions on the SVI system.

Both local and exported volumes used by data services products can be explicitly managed by a graphical user interface or a command line interface. The graphical user interface can be launched using any conventional method and generates several screen displays illustrated in FIGS. 9–12.

Figure 9:
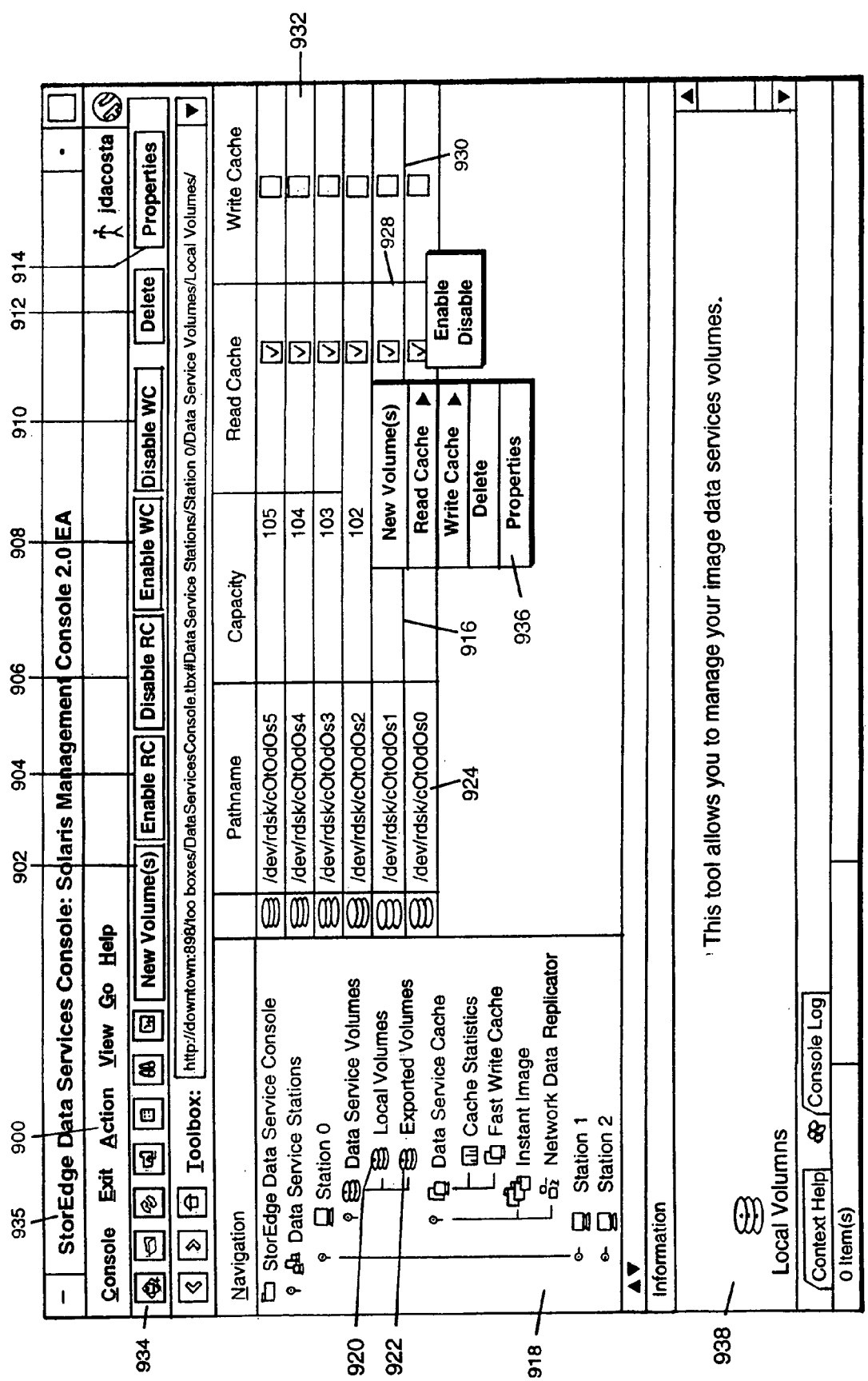
FIG. 9 is a screen shot of a screen display generated by a graphic user interface that controls a DSV bean showing the display of local volumes under control of the data services system.

A screen shot showing the screen display generated for viewing and controlling local volumes is illustrated in FIG. 9. This figure displays a screen 900 that displays information concerning local volumes which would be generated by the graphic user interface after selection of the "Local Volumes" display 920 in the navigation pane 918. Information regarding the selection is shown in the information panel 938. Exported volumes can also be displayed as shown below by selecting the "Exported Volumes" display 922. Screen 900 illustrates information that is displayed after volumes have been configured using the "New Volume(s). . . " option 902. The screen 900 contains a table 916 that displays volume information, including the pathname in column 924, the capacity in column 926, and the status of the read and write cache in columns 928 and 930, respectively. The write cache will only be alterable if data services support for caching is installed.

The graphic user interface supports three features that perform actions on volumes. These features include right clicking on a line representing a volume, such as line 932, or a selection of volume lines in table 916, buttons 902–914 in toolbar 934, and an "action dropdown" activated by selecting menu pick 935. Each feature supports the same options, including (add) "New Volumes", "Enable" or "Disable" the read and write cache, "Delete" volumes, and view volume "Properties". FIG. 9 shows the "action dropdown" 936 with the options displayed.

Figure 10:
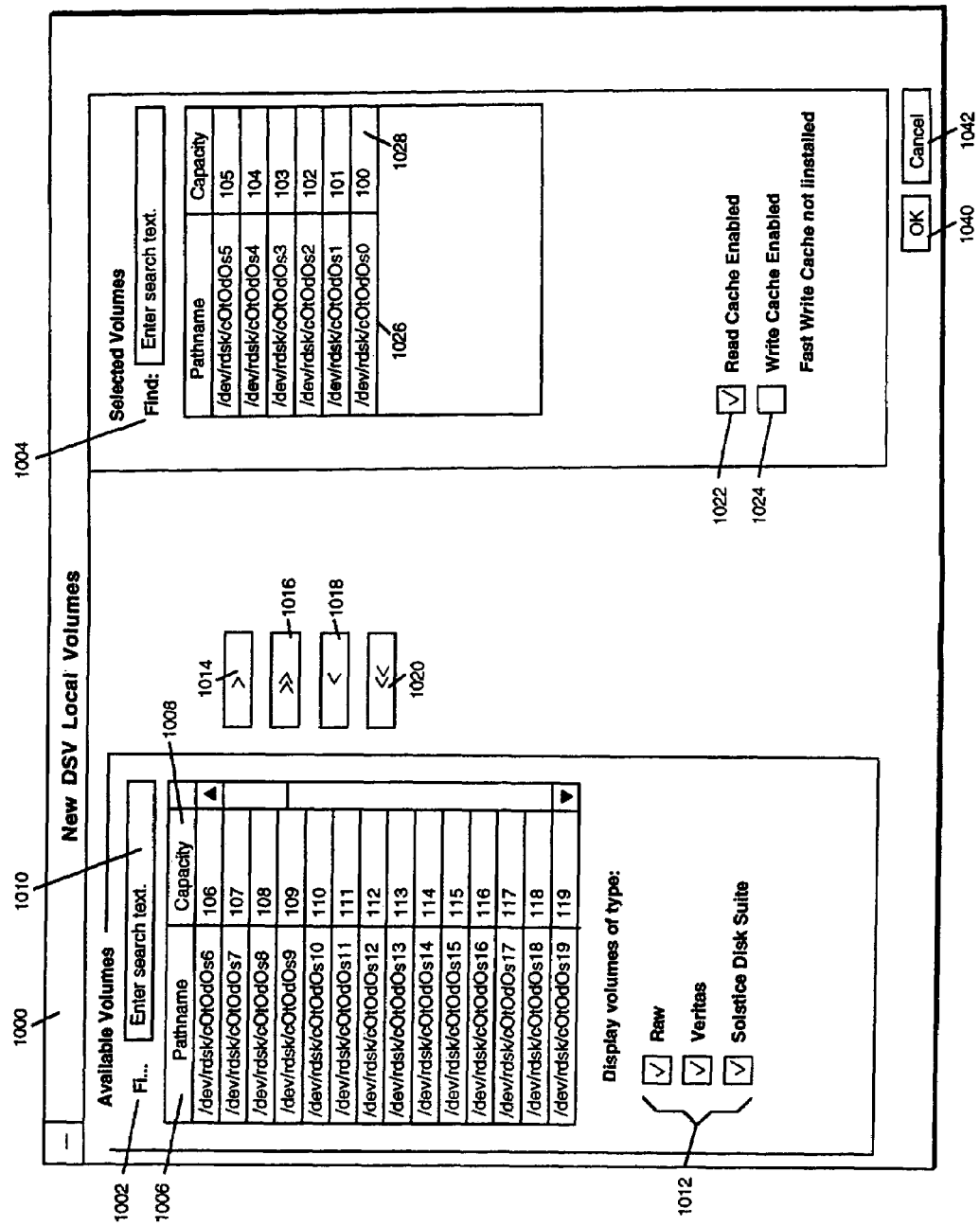
FIG. 10 is a screen shot of a screen display generated by a graphic user interface that controls a DSV bean showing a dialog box for adding new local volumes to the data services system.

FIG. 10 shows a dialog 1000 that is displayed when the "NewVolumes" option is selected by means of one of the features discussed above. This dialog allows a manager to add new volumes to the data services system. A scrolling table 1002 shows three volume types (Raw, Veritas, and Solstice Disk Suite volumes). Each line in the table represents an available disk and the table has a column 1006 showing the pathname and a column 1008 showing the volume capacity. A specific volume can be located by entering a search text in the text box 1010. In addition, volume entries displayed in table 1002 can be filtered by checking, or unchecking, checkboxes 1012 to select the type of volumes displayed.

A manager can select one or more volumes in table 1002 by clicking on the line representing the volumes. Then, using arrow button 1014 the selected volumes can be transferred to table 1004. Arrow button 1016 can be used to transfer all volumes in table 1002 to table 1004. Similarly, arrow buttons 1018 and 1020 can be used to remove selected volumes, or all volumes, respectively, from table 1004. As with table 1002, table 1004 also shows the pathname and capacity of the selected volumes in columns 1026 and 1028, respectively.

Finally, the read and write cache for the volume(s) in table 1004 can be set by selecting the appropriate check-box 1022 and 1024 beneath table 1004. After selecting the "OK" button 1040, the volumes in table 1004 will be appended to the volume(s), if any, displayed in table 916 in screen 900. Alternatively, selections can be canceled by selecting the "Cancel" button 1042 in screen 1000.

Figure 11:
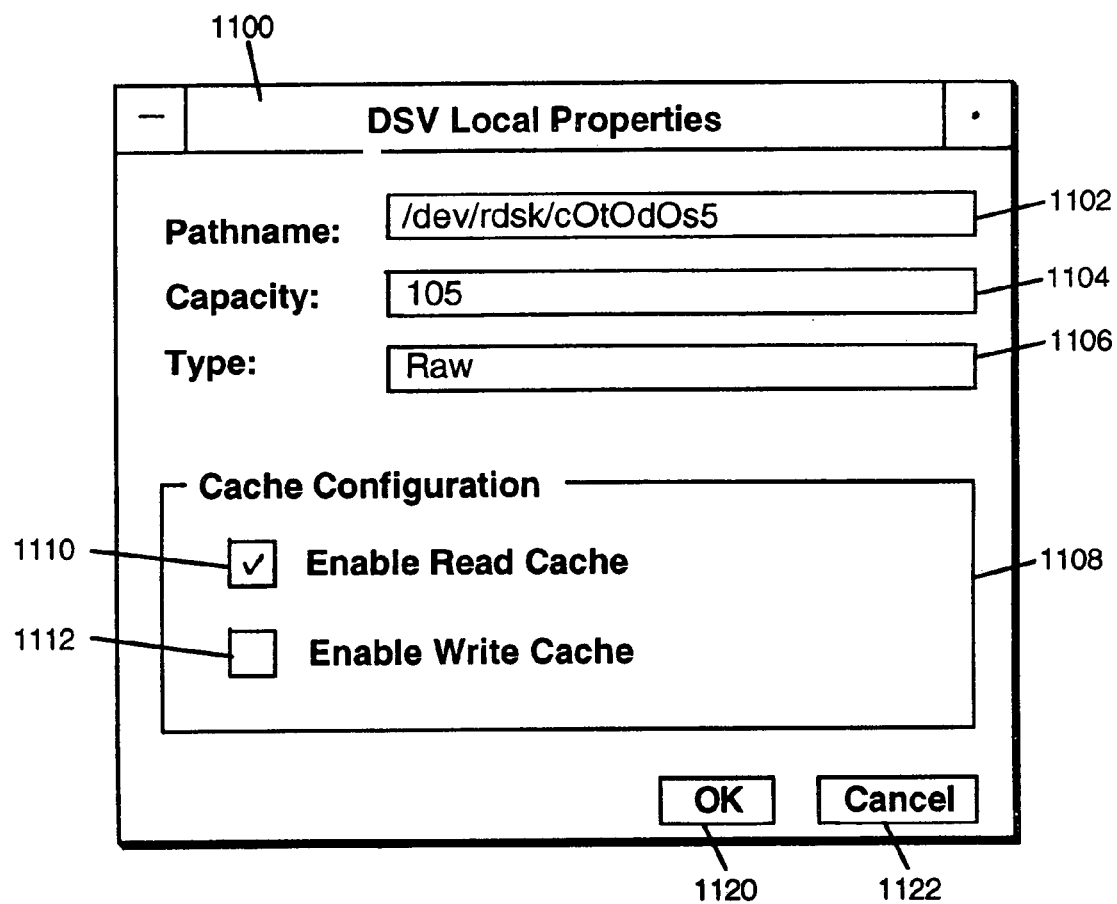
FIG. 11 is a screen shot of a screen display generated by a graphic user interface that controls a DSV bean showing a dialog box for displaying properties of local volumes.

Each volume has a set of properties that can be displayed by selecting the "Properties" option on one of the features discussed above. The properties dialog 1100 is shown in FIG. 11. Dialog 1100 shows a selected volume pathname in text box 1102, capacity in text box 1104, type in text box 1106 and cache configuration in panel 1108. Read and write caches can be enabled and disabled by checking or unchecking check boxes 1110 and 1112. The cache configuration can be saved by selecting the "OK" button 1020 or discarded by selecting the "Cancel" button 1022.

The screens generated by the graphic user interface illustrated in FIGS. 9, 10 and 11 gather information which is used by the graphic user interface to interact with the DSV Bean via the SVIBean interface discussed above. For example, volumes displayed in table 916 can be obtained by the graphic user interface by making a call to the getSVIVolumes( ) method of the SVIBean interface. Similarly, volumes can be added or removed using the dialog shown in FIG. 10 by making calls to the makeSVIVolume( ) and removeSVIVolume methods of the SVIBean interface. Finally, the cache state can be controlled via the setReadCacheEnabled method of the SVIBean interface.

Figure 12:
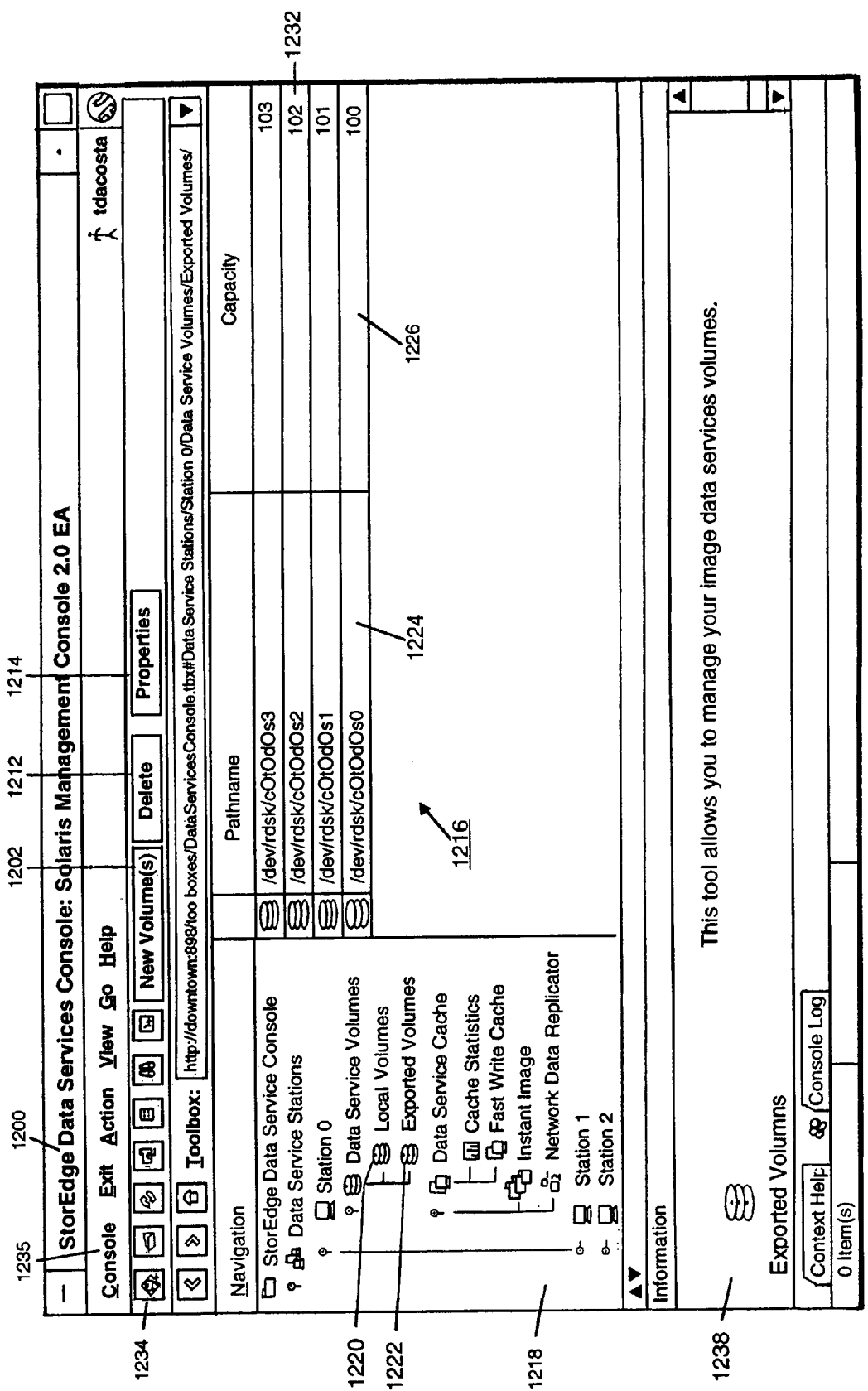
FIG. 12 is a screen shot of a screen display generated by a graphic user interface that controls a DSV bean showing the display of exported volumes under control of the data services system.

A screen shot showing the screen display generated for viewing and controlling exported volumes is illustrated in FIG. 12. This figure displays a screen 1200 that displays information concerning exported volumes which would be generated by the graphic user interface after selection of the "Exported Volumes" display 1222 in the navigation pane 1218 rather than the "Local Volumes" display 1220. Information regarding the selection is shown in the information panel 1238. Screen 1200 illustrates information that is displayed after volumes have been configured using the "New Volume(s). . . " option 1202. The screen 1200 contains a table 1216 that displays volume information, including the pathname in column 1224 and the capacity in column 1226. Unlike local volumes, there are no caching capabilities for exported volumes so no options are shown to allow selection of caching options.

The graphic user interface supports three features that perform actions on volumes. These features include right clicking on a line representing a volume, such as line 1232, or a selection of volume lines in table 1216, buttons 1202, 1212 and 1214 in toolbar 1234, and an "action dropdown" activated by selecting menu pick 1235. Each feature supports the same options, including (add) "New Volumes", "Delete" volumes, and view volume "Properties".

Figure 13:
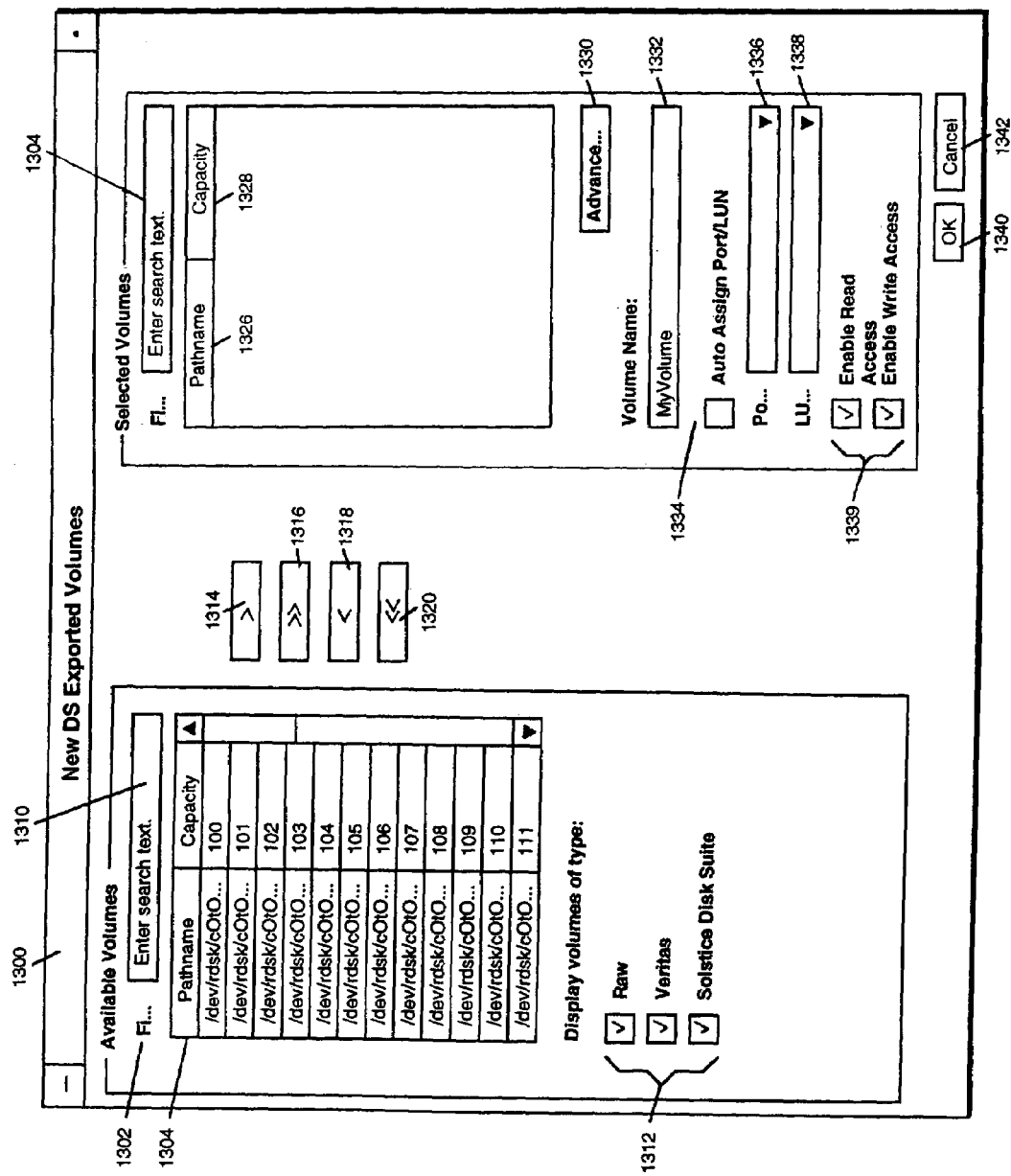
FIG. 13 is a screen shot of a screen display generated by a graphic user interface that controls a DSV bean showing a dialog box for adding new exported volumes to the data services system.

FIG. 13 shows a dialog 1300 that is displayed when the "New Volumes" option is selected by means of one of the features discussed above. This dialog allows a manager to add new exported volumes to the data services system. A scrolling table 1302 shows three volume types (Raw, Veritas, and Solstice Disk Suite volumes). Each line in the table represents an available disk and the table has a column 1306 showing the pathname and a column 1308 showing the volume capacity. A specific volume can be located by entering a search text in the text box 1310. In addition, volume entries displayed in table 1302 can be filtered by checking, or unchecking, checkboxes 1312 to select the type of volumes displayed.

A manager can select one or more volumes in table 1302 by clicking on the line representing the volumes. Then, using arrow button 1314, the selected volumes can be transferred to table 1304. Arrow button 1316 can be used to transfer all volumes in table 1302 to table 1304. Similarly, arrow buttons 1318 and 1320 can be used to remove selected volumes, or all volumes, respectively, from table 1304. As with table 1302, table 1304 also shows the pathname and capacity of the selected volumes in columns 1326 and 1328, respectively.

Finally, a volume can be given a name by entering text in text box 1352. The Fibre port and LUN values can be specified for the selected volume(s) either by checking the Auto Assign box 1334 or by manually selecting the values from drop down lists 1336 and 1338. Finally, the read and write access for the volume(s) can be set by selecting the appropriate one of check-boxes 1339. After selecting the "OK" button 1340, the volumes in the selected table 1304 will be appended to the volume(s), if any, displayed in the main exported volume screen 1200. Alternatively, selections can be discarded by selecting the "Cancel" button 1342.

Figure 14:
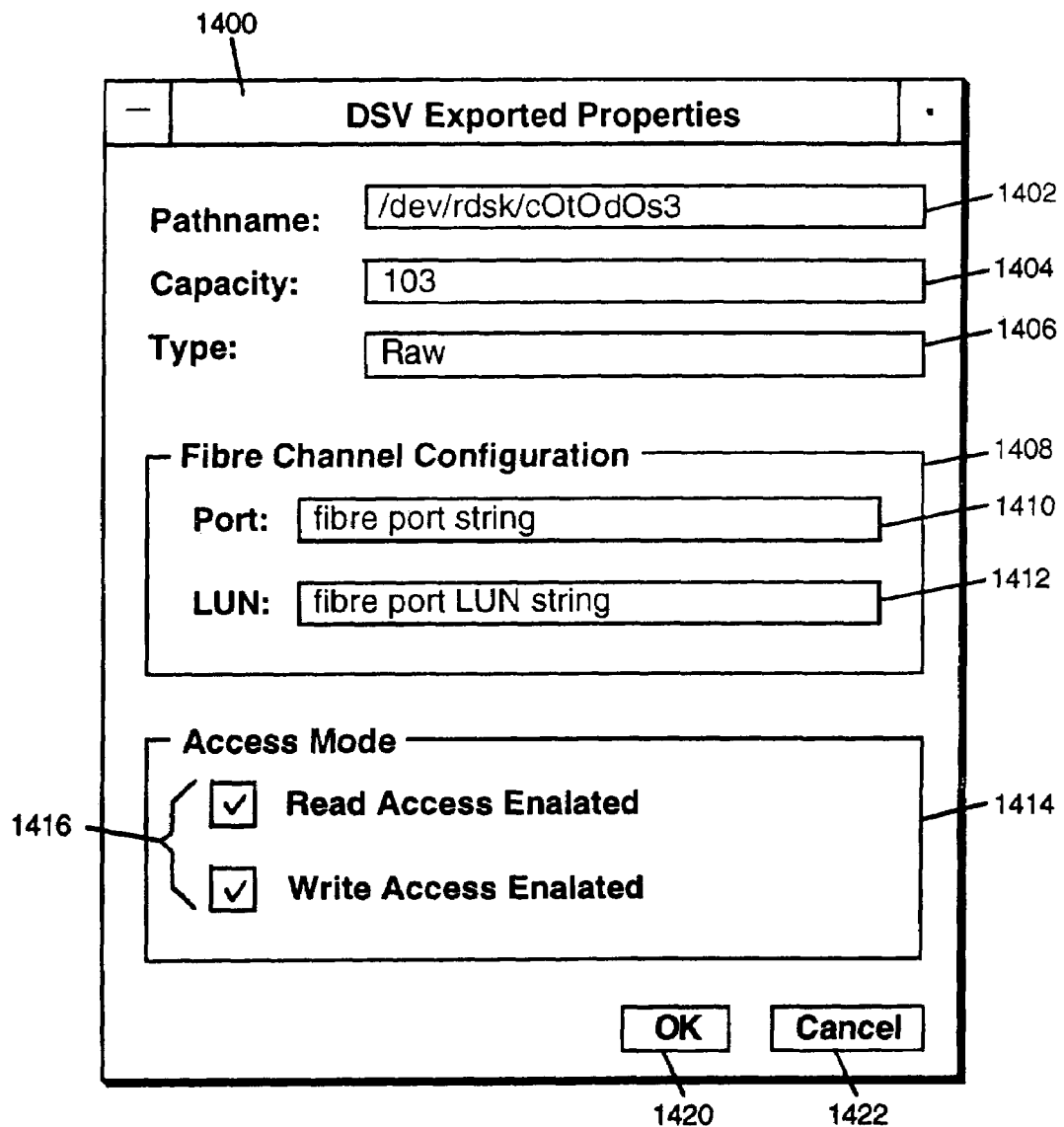
FIG. 14 is a screen shot of a screen display generated by a graphic user interface that controls a DSV bean showing a dialog box for displaying properties of exported volumes.

Each volume has a set of properties that can be displayed by activating a properties dialog 1400 using the "Properties" option in one of the features discussed above. The properties dialog 1400 is shown in FIG. 14. Dialog 1400 shows a selected volume pathname in text box 1402, capacity in text box 1404, type in text box 1406 and Fibre channel configuration in panel 1408 including the port and LUN values in text boxes 1410 and 1412. Read and write access is displayed in check boxes 1416 in "Access Mode" panel 1414. The cache configuration can be saved by selecting the "OK" button 1420 or discarded by selecting the "Cancel" button 1422.

The screens generated by the graphic user interface illustrated in FIGS. 12, 13 and 14 gather information which is used by the graphic user interface to interact with the DSV Bean via the STEBean interface discussed above. For example, volumes displayed in table 1216 can be obtained by the graphic user interface by making a call to the getSTEVolumes( ) method of the STEBean interface. Similarly, volumes can be added or removed using the dialog shown in FIG. 13 by making calls to the makeSTEVolume( ) and removeSTEVolume methods of the STEBean interface. Finally, the port information can be obtained via the getAvailablePorts( ) method of the STEBean interface.

Alternatively, a DSV federated bean can also be controlled by a command line interface. The basic command is dsvadm. Various parameters and variables are used with this command to generate the appropriate information that can be used by the DSV bean to perform the desired operation. The various operations that can be specified with the command line interface include the following.

dsvadm-V [-s] Displays status of SVI data service.
dsvadm-v-a Adds a volume to SVI control
dsvadm-V-r Removes a volume from SVI control.
dsvadm-V-d [disk . . .] Disables all SVI devices or one or more SVI devices when an option is specified.
dsvadm-T-d [vdn| tmn]. . . Disables all STE devices or one or more STE devices when the options are specified.
dsvadm-V-e [disk . . .] Enables all SV devices or one or more SVI devices when the options are specified.
dsvadm-T-e [vdn| tmn]. . . Enable all STE devices or one or more STE devices when a virtual disk number or a target port number is specified.
dsvadm-V-r Reconfigure the SV subsystem.
dsvadm-T-I Generate a trace file
dsvadm-T-I [tmn] Display information for a given port. If no port is specified, the first port is chosen as the default port. The following additional commands are available from within the statistics display:
  0–7: Display information for given Target-Mode Port
  z: Zero statistics. If the statistics currently displayed are for one Target-Mode Port, only its values are cleared. If multiple Target-Mode Ports are being displayed, then all TargetMode Port values are cleared.
  R: Display read statistics for all Target-Mode Ports
  w: Display write statistics for all Target-Mode Ports
  o: Display the 'other' statistics for all Target-Mode Ports
  f: Display full (read, write, and other) statistics
  p: Display previous Target-Mode Port's statistics
  v: Display Virtual Disk statistics
  +: Increase refresh rate by one second (max refresh once per second)
  −: Decrease refresh rate by one second
  q: Quit
  ?: List of additional statistic display commands
dsvadm-T-p [vdn|tmnumber]. . . Reads and displays configuration information from the STE software. Modifications that were made to the STE configuration file after starting the STE software are not reflected in the listing. If one or more vdisk and/or tm numbers are supplied, configuration information is presented for the specified component(s) only.
dsvadm-T-m [flags . . .] Sets special debug flags used by the STE software, as specified by the hexadecimal argument. The following bit values control the debug flags: Bit 0 Enable SCSI Command Tracing Bits 1-15 Reserved. If flags is not specified, the current debug flags are displayed.
dsvdam-T-v [partition] [port] [LUN] [state] [options . . .]
Define a virtual disk. The user must specify a vdisk, and may specify any other options. If the user does not specify any options, they will be prompted for them at the command line.
dsvadm-T-t [driver] [devicename] [loopid]Add a port. The user must specify a port number and may specify any other options. If the user does not specify any options, they will be prompted for them at the command line.
dsvadm-T-u Remove a virtual disk and/or port.

Two additional commands can also be used to control STE and SVI disks directly. These commands include steadm and svadm. The commands usage is as follows:
steadm-e [-f] [vdiskN|tmN]. . . steam-d [vdiskN|tmN]. . . steadm-p [vdiskN|tmN]. . . steadm-R tmN . . . steadm-I [tmN] steadm-m [ ]steadm-I
svadm display status svadm-e [-f conf_file] enable from conf_file svadm-d disable all sv device svadm-r [-f conf_filge] which reconfigures an SVI device from a configuration file conf_file When using these commands, the command and accompanying parameters are first separated by a conventional parser. The parsed command and parameters are then provided to an interpreter which generates the appropriate objects and calls the API routines exported by the DSV bean to set up the data services system.

Figure 15:
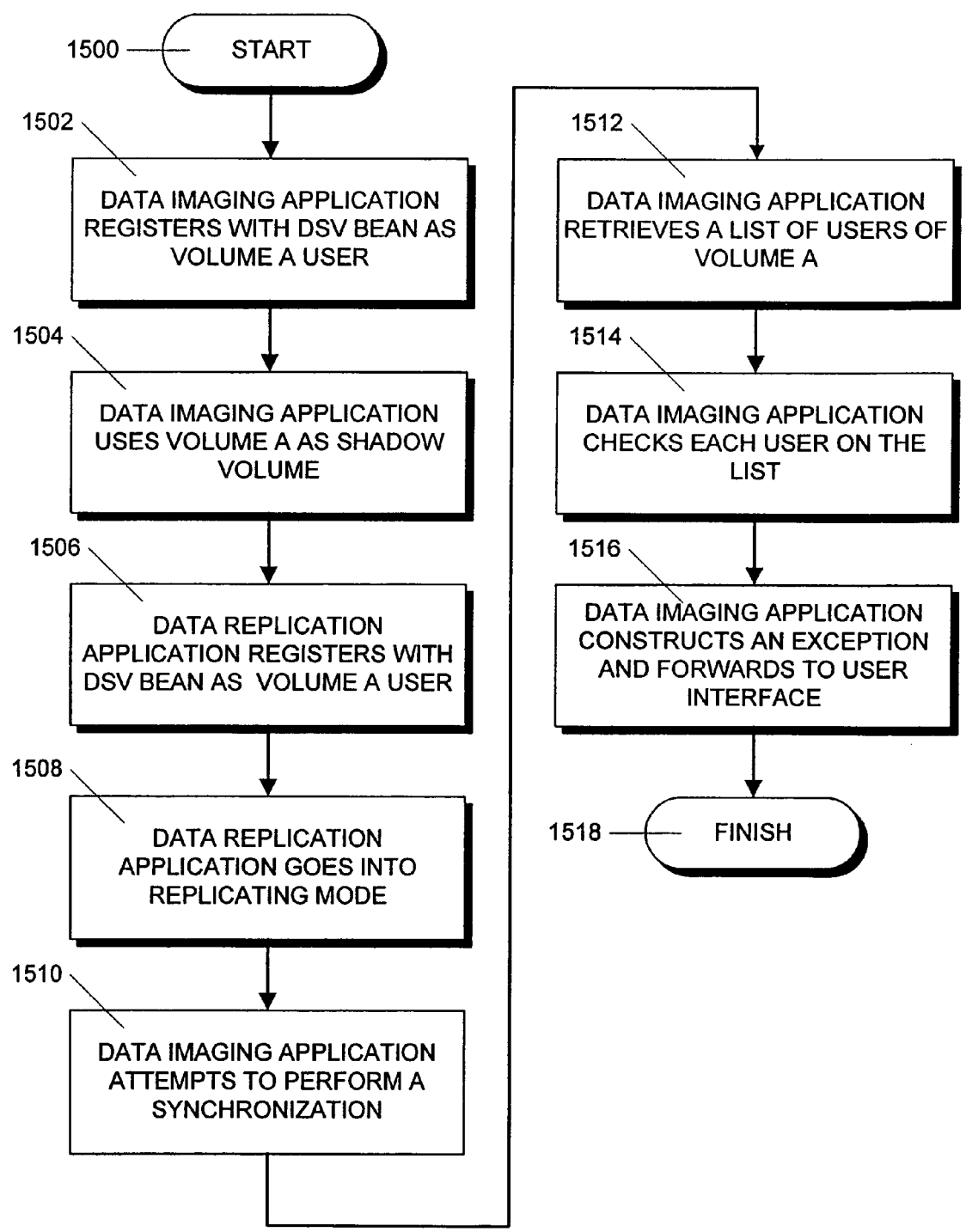
FIG. 15 is a flowchart illustrating the steps in a process that involves a conflict between two data services and shows how one process can obtain information regarding the conflict.

FIG. 15 shows the steps in an illustrative process that uses the features of the present invention. In this process, the inventive data services system is used to provide information to one user when his access to a volume conflicts with another user, thereby facilitating the concurrent use of a volume. The particular scenario described involves two different data services. In this example, a data imaging system and a data replication system are both controlled by Jiro™-enabled management software and are implemented by a data imaging (DI) bean and a data replication (DR) bean.

The process starts in step 1500 and proceeds to step 1502 where the DI application registers itself as a user of a local volume A by calling the registerSVIUser( ) method of the DSV Bean and passing in a proxy to itself as described above with respect to FIG. 3. If the DI bean is the first user, the user list for volume A only contains one entry—the proxy to the DI Bean. In response, the DSV Bean configures volume A into the SV data service as described above.

Next, in step 1504, the DI Bean uses volume A as a shadow volume of a master/shadow volume pair that will be used in the data imaging process. In order to operate with the inventive system, the DI Bean must implement the SVIVolumeUser interface. As discussed above concerning FIG. 5, this interface includes various methods that can be called by another application to obtain information that describes how the volume is being used. However, at this point, the other applications in the distributed management system are not interested in how the data imaging system is using volume A.

In step 1506, another application, implemented by the DR Bean, registers itself as a user of volume A, again, by calling the registerSVIUser( ) method of the DSV bean and passing in a proxy to itself. The DSV Bean recognizes that volume A is already configured in the SV data service, so it adds the DR Bean proxy to the list of users of volume A. Assume the DR Bean uses volume A as a secondary volume in a data replication primary/secondary volume pair.

Next, in step 1508, the data replication system immediately goes into replicating mode. In replicating mode, a secondary volume cannot be written by application except the DR data service. Since the data imaging system is not being used, there still is no conflict over the use of volume A However, in step 1510, the data imaging system attempts to do a Master-to-Shadow synchronization which involves an image of the data on the master volume being written to the shadow volume (which is volume A in this example.) This operation fails because volume A is reserved for exclusive use as a secondary volume by the DR bean. The DI Bean catches an exception thrown by the failure. In prior art systems, the cause of the failure would have to be determined by a system manager because the exception contains no information as to the cause of the failure.

However, in accordance with the principles of the invention, the data management system can gather additional information regarding the cause of the failure. In particular, the DI Bean must gather additional information to determine why the write failed. In step 1512, the DI bean retrieves a list of the users of volume A by calling the getUsers( ) method in the DSV bean passing in the volume A name as a parameter.

Then, in step 1514, the DI bean checks each user of volume A on the list by calling the SVIVolumeUser.allowWrite(volA) method on every proxy on the list. When the SVIVolumeUser.allowWrite(volA) method of the DR Bean proxy is called, it returns false. The DI Bean can then determine that DR Bean is not allowing writes to volume A.

The DI Bean then gathers up information about the failure in step 1516 and constructs an exception based on the acquired information. This information can include the name of the application that prevented the write (available from the SVIVolumeUser.getUserName( ) method), and exactly for what the application is using the volume (available from the SVIVolumeUser.getUse( . . . ) method). This exception is passed back to the user interface, which could generate an informative error message for the user such as:

"The data imaging Master to Shadow synchronization failed because the Network Data Replication application is not allowing writes to volume A. The Network Data Replication application is currently using that volume as a Secondary Volume. Would you like to put the Network Data Replication application into logging mode?"

A software implementation of the above-described embodiment may comprise a series of computer instructions either fixed on a tangible medium, such as a computer readable media, for example, a diskette, a CD-ROM, a ROM memory, or a fixed disk, or transmittable to a computer system, via a modem or other interface device over a medium. The medium can be either a tangible medium, including but not limited to optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, different arrangements can be used for the scope and arrangement of the federated beans. Other aspects, such as the specific process flow, as well as other modifications to the inventive concept are intended to be covered by the appended claims.

What is claimed is:

1. A method for managing data volumes from a management terminal in a distributed computer system having a host computer system with at least one storage device connected to the computer system by driver software, the method comprising:
   (a) inserting an interface layer between the driver software and the storage device, the interface layer exporting a platform dependent API comprising a plurality of API methods are called to control data passing between the driver software and the storage device;
   (b) running, in the host computer system, management facade software, wherein said management facade software receives calls to platform-independent methods and generates at least one API method call to the interface layer in order to execute the platform-independent method calls;
   (c) running, in the host computer system, a federated bean, wherein said federated bean discovers data volumes in the storage device and generates platform-independent method calls to the management facade to control the interface layer via the plurality of API methods; and
   (d) controlling the federated bean to display and configure the data volumes.

2. The method of claim 1 wherein step (d) comprises controlling the federated bean with a command line interface.

3. The method of claim 1 wherein step (d) comprises controlling the federated bean with a graphical user interface.

4. The method of claim 1 wherein step (a) comprises inserting a SCSI terminal emulation interface layer between the driver software and the storage device, which interface layer makes the storage device appear as a SCSI device.

5. The method of claim 1 wherein step (a) comprises inserting a storage volume interface layer between the driver software and the storage device, inserting an additional data service interface layer between the storage volume interface layer and the storage device and using the storage volume interface layer to divert information passing between the driver software and the storage device to the additional data service layer.

6. The method of claim 1 wherein step (c) comprises:
   (c1) displaying all data volumes on the host computer system with information regarding the data volumes.

7. The method of claim 6 wherein the data volumes on the host have various volume types and step (c1) comprises displaying all data volumes of each volume type together wherein information regarding each data volume type is presented uniformly.

8. The method of claim 1 further comprising:
   (e) running a distributed management framework in the computer system, the distributed management framework having a lookup service; and
   (f) using the lookup service to locate the federated bean.

9. The method of claim 1 wherein the federated bean maintains a list of users for each of the data volumes and the method further comprises:
(g) registering each user of one of the data volumes with the federated bean when the each user requests use of the one data volume; and
(h) upon registration, entering the data volume user into a list maintained for the one data volume.

10. The method of claim 1 further comprising:
(i) retrieving a list of users for a specific volume from the federated bean; and
(j) contacting each user on the list to determine how the each user is using the specific volume.

11. The method of claim 10 wherein each user has a method describing how the each user is using the specific volume and wherein step (j) comprises contacting each user on the list and running the method in the each user.

12. An apparatus for managing data volumes from a management terminal in a distributed computer system having a host computer system with at least one storage device connected to the computer system by driver software, the apparatus comprising:
an interface layer is inserted between the driver software and the storage device, the interface layer exporting a platform dependent API comprising a plurality of API methods are called to control data passing between the driver software and the storage device;
management facade software in the host computer system, wherein said management facade software receives calls to platform-independent methods and generates at least one API method call to the interface layer in order to execute the platform-independent method calls;
running, in the host computer system, a federated bean, wherein said federated bean discovers data volumes in the storage device and generates platform-independent method calls to the management facade to control the interface layer via the plurality of API methods; and
a presentation program controls the federated bean to display and configure the data volumes.

13. The apparatus of claim 12 wherein the presentation program comprises a command line interface.

14. The apparatus of claim 12 wherein the presentation program comprises a graphical user interface.

15. The apparatus of claim 12 wherein the interface layer comprises a SCSI terminal emulation interface layer that makes the storage device appear as a SCSI device.

16. The apparatus of claim 12 wherein the interface layer comprises:
a storage volume interface layer located between the driver software and the storage device; and
an additional data service interface layer located between the storage volume interface layer and the storage device and wherein the storage volume interface layer is used to divert information passing between the driver software and the storage device to the additional data service layer.

17. The apparatus of claim 12 wherein the federated bean comprises a logical disk aggregator that retrieves information from all data volumes on the host.

18. The apparatus of claim 17 wherein the data volumes on the host have various volume types and the logical disk aggregator comprises mechanisms that retrieve information from each volume type.

19. The apparatus of claim 12 wherein the computer system has a distributed management framework with a lookup service running therein; and the apparatus further comprises a mechanism in the lookup service that locates the federated bean.

20. The apparatus of claim 12 wherein the federated bean comprises a list of users for each of the data volumes and a mechanism for registering each user of one of the data volumes with the federated bean when the each user requests use of the one data volume by entering the data volume user into a list maintained for the one data volume.

21. The apparatus of claim 12 wherein the federated bean further comprises a mechanism that retrieves a list of users for a specific volume from the federated bean and a mechanism that contacts each user on the list to determine how the each user is using the specific volume.

22. The apparatus of claim 21 wherein each user has a method describing how the each user is using the specific volume and wherein the mechanism that contacts each user comprises a mechanism for calling the method in the each user.

23. A computer program product for managing data volumes from a management terminal in a distributed computer system having a host computer system with at least one storage device connected to the computer system by driver software, the computer program product comprising a computer usable medium having computer readable program code thereon, including:
interface layer program code for insertion between the driver software and the storage device, the interface layer program code exporting a platform dependent API comprising a plurality of API methods are called to control data passing between the driver software and the storage device;
management facade software receives calls to platform-independent methods and generates at least one API method call to the interface layer in order to execute the platform-independent method calls;
federated bean program code discovers data volumes in the storage device and generates platform-independent method calls to the management facade to control the interface layer via the plurality of API methods; and
a presentation program controls the federated bean to display and configure the data volumes.

24. The computer program product of claim 23 wherein the presentation program comprises a command line interface.

25. The computer program product of claim 23 wherein the presentation program comprises a graphical user interface.

* * * * *